C. F. CRANDALL.

TYPE WRITING MACHINE.

APPLICATION FILED JULY 14, 1909.

Reissued Dec. 27, 1910.

13,185.

WITNESSES:

E. M. Wells

Charles E. Smith

INVENTOR:

Charles F. Crandall

By Jacob Felbel

HIS ATTORNEY

UNITED STATES PATENT OFFICE.

CHARLES F. CRANDALL, OF ILION, NEW YORK, ASSIGNOR TO UNION TYPEWRITER COMPANY, OF JERSEY CITY, NEW JERSEY, A CORPORATION OF NEW JERSEY.

TYPE-WRITING MACHINE.

13,185. Specification of Reissued Letters Patent. Reissued Dec. 27, 1910.

Original No. 882,627, dated March 24, 1908, Serial No. 383,881. Application for reissue filed July 14, 1909. Serial No. 507,657.

*To all whom it may concern:*

Be it known that I, CHARLES F. CRANDALL, a citizen of the United States, and resident of Ilion, in the county of Herkimer and State of New York, have invented certain new and useful Improvements in Type-Writing-Machines, of which the following is a specification.

My invention relates to typewriting machines and more particularly to means for adjustably supporting a type bar hanger in place.

The main object of my invention is to provide an improved type bar hanger and means for adjustably supporting the same in place, whereby a type bar may be conveniently adjusted on its support or segment and may be removed and replaced with facility.

To the above and other ends which will hereinafter appear, my invention consists in the features of construction, arrangements of parts and combinations of devices to be hereinafter described and particularly pointed out in the appended claims.

Figure 1:
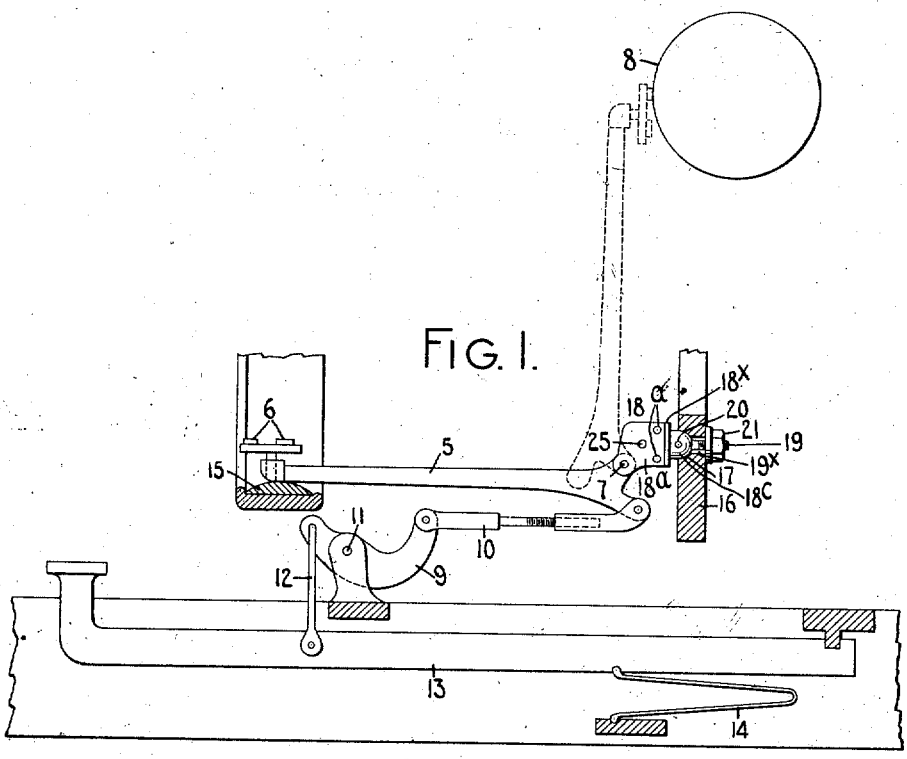
Figure 7:
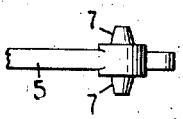
Figure 8:
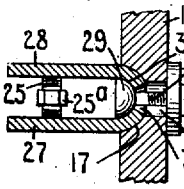
Figure 9:
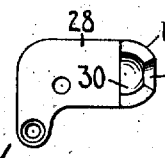
Figure 4:
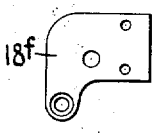
Figure 5:
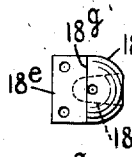
Figure 6:
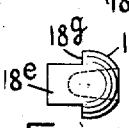
Figure 2:
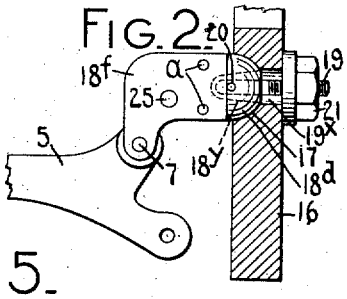
Figure 3:
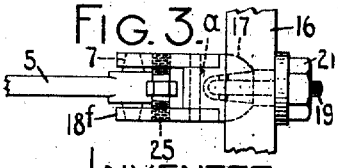

In the accompanying drawings in which like reference characters indicate corresponding parts in the various views, Figure 1 is a side elevation of one form of type bar hanger and support embodying my invention, the construction being shown in its relation to other coöperative parts of what is ordinarily termed a visible or front-strike typewriter. Fig. 2 is an enlarged detail side elevation of a slightly different form of hanger, together with portions of the type bar and segement, the latter being shown in section. Fig. 3 is a plan view of the parts shown in Fig. 2. Fig. 4 is a detail inside view of one of the walls or side plates of the hanger shown in Figs. 2 to 6. Fig. 5 is a side elevation, and Fig. 6 is a plan view of what may be termed the base piece or block of the hanger. Fig. 7 is a detail plan view showing the pivotal end of the type bar. Fig. 8 is a transverse sectional view of a modified form of construction of hanger and the mounting therefor. Fig. 9 is an inside face view of one of the main parts of the form of construction shown in Fig. 8.

While I have shown my invention in the present instance embodied in a front-strike machine, it should be understood that it may be embodied in various other styles of typewriting machines.

In the drawings, 5 indicates the type bar carrying the ordinary double-faced type 6 and pivoted at 7 and arranged in such manner as to strike upwardly and rearwardly against the front face of a platen 8. For operating the type bar there is provided a bell crank lever 9 connected by a connecting rod or link 10 with the short arm of the type bar. The link 10 comprises two members adjustably connected together. The lever 9 is pivotally mounted in any suitable fixed support or bearing as at 11, and is connected by a connecting rod or link 12 with a key lever 13. A restoring spring 14 is employed for lifting the key lever and assisting in returning the type bar to its normal position. 15 indicates a pad on which the free end of the type bar is adapted to rest in its normal position. The particular details of all these parts is not material as my improvements hereinafter described are equally useful in other styles of machines, such, for instance, as typewriting machines in which the type bars normally are in a suspended position and strike inwardly and upwardly.

A support or segment for the type bar hangers is shown at 16, said segment having a series of segmentally arranged semi-spherical sockets 17, there being as many sockets 17 provided as are required for mounting the desired number of type bars.

In the construction shown in Fig. 1 each type bar hanger, designated as a whole by the reference numeral 18, consists of two main side walls, plates or hanger arms $18^a$ spaced apart to receive the pivotal end of the type bar and secured to the hanger base piece $18^b$ conveniently by a pair of rivets *a*; the rear ends of the hanger arms abutting a flange $18^x$ formed on the base piece and projecting laterally from each side thereof. The base block or piece $18^b$ is provided with a semispherical bearing end or head $18^c$ which is received and fits snugly in a socket 17 in the segment, there being a clearance between the flanged portion $18^x$ of the base piece and the front face of the segment to enable the hanger to swing slightly in any direction around the ball and socket-like bearing joint $18^c$ and 17. For securing the hanger to the segment there is provided a bolt 19, which passes through an enlarged opening $19^x$ in the segment and into an enlarged opening or socket in the base piece $18^b$ of the hanger. The bolt 19 is loosely connected to the part $18^b$ by a pin 20 which is seated at its ends in the walls of the base piece and passes across the socket therein. On the rear side of the segment 16 the bolt is provided with a nut 21 and preferably with a washer as shown by which the hanger is held in its adjusted position. The pivotal end of the type bar 5 is provided with conical trunnion-like bearing projections 7 which fit conical bearing openings in the walls of the hanger. Extending between the walls of the hanger and threaded into each hanger arm is a screw 25 having right and left-hand threads engaging in tapped openings in said arms and provided centrally with an angular enlargement or boss adapted to receive a wrench. By rotating the screw 25 in one direction or the other the walls $18^a$ may be drawn toward each other or forced apart, whereby the type bar 5 may be very nicely and accurately adjusted in its bearings. When the nut 21 securing a hanger 18 is loosened the hanger may be adjusted to a limited amount in any direction by swinging it around the universal joint by which it is connected to the segment, or if desired the hanger may receive a swivel-like adjustment around the longitudinal axis of the bolt 19 which extends at right angles to the axis of revolution of the type bar. Under this adjustment the bolt 19 will turn with the hanger. By these means the position of the type with reference to the platen may be changed as desired. When the proper adjustment of the hanger has been attained it may be firmly secured in its adjusted position by tightening the nut 21.

The construction of hanger shown in Figs. 2 to 6 inclusive is substantially the same as that disclosed in the preceding figure. In the construction shown in Figs. 2 to 6, however, the flange $18^x$ is omitted and the ball-like member $18^d$ of the base piece $18^e$ of the hanger is made larger than in the construction shown in Figs. 1 and 2, to give a greater bearing and gripping surface in the socket 17. It will be observed that in the construction shown in Figs. 2 to 6 the ball-like portion $18^d$ is of a diameter equal to the breadth of the hanger arms or plates $18^f$, the base piece or block $18^e$ being cut away at the sides to receive the hanger arms or plates and to form shoulders $18^g$ against which the ends of the hanger arms abut, rivets *a* securing the hanger arms to the block. Like the previously described construction the ball-like member of the joint is received in a corresponding socket 17 in the segment to form a ball and socket or universal joint between the hanger and segment, to afford an up and down or sidewise adjustment of the hanger or to afford a swivel-like turning adjustment of the hanger around the longitudinal axis of the securing bolt 19. As in the previously described construction the bolt 19 passes through an enlarged opening $19^x$ in the segment and into an enlarged socket $18^y$ in the rear end of the base piece $18^e$ and the cross pivot pin 20 loosely connects the base piece with the bolt.

In the constructions thus far described it is necessary that the pivotal end of the type bar be inserted in place between the plates $18^a$ or $18^f$ before the several parts of the hanger are secured together. In the modified form of construction shown in Figs. 8 and 9 this is obviated by forming the hanger in two parts 27 and 28 and these parts include a semispherical bearing part *b*, which engages in the socket 17 in the segment to afford a universal adjustment of the hanger. For the purpose of securing the hanger in its adjusted position in the socket 17 there is provided a bolt $19^a$ having a semispherical head 29 engaging in a semispherical socket 30 provided partially in one part 28 and partially in the other part 27, the bolt passing freely through an enlarged opening 31 in the bearing part *b*. The semispherical head part of this hanger is adapted to be received in a semispherical recess in the segment 16 as in the previously described constructions, and the same is adapted to be held and firmly clamped in any desired position by the bolt. In this construction a swivel-like adjustment of the hanger around the longitudinal axis of the bolt $19^a$ may be effected independently of the bolt, whereas in the previously described construction the bolt 19 turns with the hanger under such an adjustment. It will also be noted with reference to the construction shown in Figs. 8 and 9 that when the hanger is removed from the socket 17, it can be entirely taken down by removing the screw 25.

From the foregoing description it will be understood that in each of the constructions shown a screw or screw bolt coöperates with one of the ball and socket members to prevent a relative movement between them and to thus hold the hanger in its adjusted position and that said screw also enables the hanger to be readily secured to or removed from its support. It will also be observed that the construction, by its swivel-like connection between the hanger and its support, enables the hanger to receive a circular adjustment to any desired extent around an axis (of the bolt 19 or $19^a$) that extends at substantially right angles to the pivotal axis of the type bar and that the hanger may be secured in such adjusted position. Moreover, the parts $18^e$, $18^d$ and *b* may be regarded as stems of the hangers that extend at substantially right angles to the plane of the segment and which are received in openings 17 in the segment and afford a circular adjustment of each hanger around the longitudinal axis of its stem.

It is evident that other modifications and changes in and from the construction herein described may be made without departing from the spirit of my invention.

What I claim as new and desire to secure by Letters Patent, is:—

1. In a typewriting machine, the combination with a type bar hanger and its support, of a universal joint between said hanger and its support and by means of which the hanger may be adjusted to different set positions.

2. In a typewriting machine, the combination with a type bar hanger and its support, of a ball and socket joint between said hanger and its support and by means of which the hanger may be adjusted to different set positions.

3. In a typewriting machine, the combination with a type bar hanger and its support, of a universal joint between said hanger and its support and by means of which the hanger may be adjusted to different set positions, and means for effecting a ready disconnection of the hanger from its support.

4. In a typewriting machine, the combination with a type bar hanger and its support, of a ball and socket joint between said hanger and its support and by means of which the hanger may be adjusted to different set positions, and means for enabling the ball and socket to be readily connected and disconnected.

5. In a typewriting machine, the combination with a type bar hanger and its support, of a universal joint between said hanger and its support, and means for locking the parts of the joint against relative movement.

6. In a typewriting machine, the combination with a type bar hanger and its support, of a universal joint between said hanger and its support, said universal joint including adjustable means that enable the parts of the joint to be readily connected and disconnected and enable the hanger to be readily connected to or disconnected from its support.

7. In a typewriting machine, the combination with a type bar hanger and its support, of a universal joint between said hanger and its support, and means for securing the hanger in the position to which it may be adjusted around said universal joint.

8. In a typewriting machine, the combination with a type bar hanger and its support, of a ball and socket joint between said hanger and its support, and means for preventing the ball and socket from turning relatively to each other.

9. In a typewriting machine, the combination with a type bar hanger and its support, of a ball and socket joint between said hanger and its support, and a screw which coöperates with the ball and socket members and prevents a relative movement between said members.

10. In a typewriting machine, the combination with a type bar hanger and its support, of a ball and socket joint between said hanger and its support and by means of which the hanger may be adjusted to different set positions, one of the ball and socket members being adjusted in part by a screw.

11. In a typewriting machine, the combination with a type bar hanger and its support, of a ball and socket joint between said hanger and its support, one of the ball and socket members comprising relatively adjustable parts by which said members may be secured in fixed relation and by which the hanger may be readily secured to or removed from its support.

12. A hanger for a type bar having substantially semispherical bearing, a frame bar having socket to receive the bearing and a bolt engaging in the hanger and passing through the socket and the bar and arranged to bind the hanger to the bar, substantially as set forth.

13. A hanger for a type bar having substantially semispherical bearing, a frame bar having a socket to receive the bearing, a bolt movably engaging the hanger and passing through the socket and frame bar, substantially as set forth.

CHARLES F. CRANDALL.

Witnesses:

CHARLES E. SMITH,
J. B. DEEVES.